United States Patent [19]

Mori

[11] Patent Number: 4,469,853
[45] Date of Patent: Sep. 4, 1984

[54] PROCESS FOR PREPARING POLYOLEFINS

[75] Inventor: Ado Mori, Ichihara, Japan

[73] Assignee: Mitsui Petrochemical Industries, Ltd., Chiyoda, Japan

[21] Appl. No.: 477,615

[22] Filed: Mar. 22, 1983

Related U.S. Application Data

[63] Continuation of Ser. No. 201,397, Sep. 29, 1980, abandoned.

[51] Int. Cl.³ ............................................. C08F 2/34
[52] U.S. Cl. ........................................ 526/59; 526/60
[58] Field of Search .............................. 526/59, 60, 61

[56] References Cited

U.S. PATENT DOCUMENTS

| | | | |
|---|---|---|---|
| 3,130,187 | 4/1964 | Tolin | 260/95 A |
| 3,254,071 | 5/1966 | Morgan | 260/95 A |
| 3,356,667 | 12/1967 | Smith | 526/61 |
| 3,476,729 | 11/1969 | Smith | 526/60 |
| 3,817,962 | 6/1974 | Smith | 526/60 |
| 3,998,995 | 12/1976 | Buss | 260/95 A |

*Primary Examiner*—Paul R. Michl
*Attorney, Agent, or Firm*—Kenway & Jenney

[57] ABSTRACT

The invention is to provide an improved process for preparing polyolefins having predetermined properties, in particular, melt index and/or density by polymerizing olefin in the presence of a Ziegler catalyst and hydrogen. The parameters corresponding to the concentrations of olefin and hydrogen, participating in the properties, in the gas phase of reactor are detected by high-speed gaschromatography. The detected signals are applied to a computer.

The feed volumes of olefin and hydrogen into the reactor are controlled by means of an operation control output, and the respective concentrations in the reactor are controlled. Consequently, the resulting polyolefins possess extremely stable and uniform properties.

22 Claims, 7 Drawing Figures

PROCESS FOR PREPARING POLYOLEFINS

This is a continuation of application Ser. No. 201,397 filed Sept. 29, 1980, now abandoned.

DESCRIPTION

TECHNICAL FIELD

The present invention relates to a process for preparing polyolefins having predetermined properties in the presence of a Ziegler catalyst. More particularly, it relates to a process for preparing polyolefins having predetermined properties by detecting parameters determinative of those properties by gaschromatography, generating signals corresponding to the detected parameters, comparing those signals to predetermined values and controlling the parameters.

BACKGROUND ART

In the industrial preparation of polyolefins, it is generally desirable to perform the reaction in a reactor kept at a determined temperature and at a constant production rate, in a continuous process, in order to obtain polyolefins having predetermined properties. In the preparation of polyolefins that is performed in the presence of a Ziegler catalyst, there are many properties of the produced polyolefins to be controlled. Of these properties, the melt index and the density are the most important factors. The melt index and the density of polyolefins reflect the average molecular weight and are optionally chosen, depending on the purpose for which the polyolefin is to be used. These indices enable consumers to choose the proper polyolefin for an intended use.

The melt index is usually measured at 190° C. for polyethylenes and at 230° C. for polypropylenes, according to the method of ASTM D1238. The polymerization rate of polyolefins is proportional to each of the concentrations of catalyst and monomer, independently, once the polymerization temperature and the catalyst are determined. In the polymerization in which a Ziegler catalyst is used, the melt index of the resulting polyolefin is controlled by hydrogen which acts as a chain transfer agent. Thus, the melt index of the resulting polyolefin is determined by the concentration ratio of hydrogen to olefin (other factors, including species of catalyst, temperature, volume and shape of the reactor also influence the melt index). The density of a polyolefin is measured according to the method of ASTM D1505-67. The density of a polyolefin is usually determined by various factors, including species of catalyst, temperature, volume of the reactor, amount of comonomer, and the like. Control of the density is usually performed by controlling the molar ratio of olefin to comonomer. Increase in the amount of comonomer generally results in decrease of the density. For the reasons mentioned above, preparation of polyolefins is generally carried out in a continuous process by feeding predetermined amounts of catalyst, olefin and hydrogen to a reactor kept at a predetermined temperature to produce a polyolefin having predetermined properties or meeting predetermined standards. Although it is required to feed predetermined amounts of catalyst, olefin and hydrogen to the reactor in order to maintain the reaction system under predetermined conditions, it is difficult to maintain the conditions merely by controlling the reactant feeds. For example, a subtle variation or decrease in the activity of catalyst in the polymerization reaction brings about an increase in the olefin concentration in the reactor, thus resulting in decrease of the melt index of the produced polyolefin. There are many indefinable factors that influence the product properties described above. The melt index of the resulting polyolefin is sensitive to variation of the ratio of olefin to hydrogen. In industrial processes for preparing polyethylenes, for example, the relationship between the change in the melt index (M.I.) and the change in the partial pressure ratio in gas phase is approximately as shown below, always depending on polymerization conditions such as species of Ziegler catalyst, temperature, and the like.

$$\frac{\frac{\Delta MI}{MI}}{\frac{\Delta (H_2/C_2)}{(H_2/C_2)}} = 3 \sim 4$$

In the case of polyethylene, a polyethylene product will be discarded as being below standard, if it has the melt index of above ±10% range out of the predetermined value. Therefore, $\Delta(H_2/C_2)$ needs to be maintained within ±3% in order to avoid loss of production. In prior art processes, the control of the melt index has been carried out by the method in which volumes of ethylene and hydrogen are controlled by means of operation of their respective feed valves in response to the melt index measured. However, this method is deficient because of the delay in the response due to the fact that it takes approximately an hour to accomplish the measurement of the melt index. Therefore, a solution to this problem has been proposed by a method monitoring the inside of the reactor directly, that is, to determine the concentrations of olefin and hydrogen of the liquid phase in the reactor. However, this latter method is deficient for the following reasons:

1. The liquid phase to be measured must be separated from the reaction mixture or slurry composed of liquid and solid.

Under such measurement conditions, it is difficult to obtain the absolute values of olefin and hydrogen concentrations because the components to be measured tend to splash from the liquid phase.

2. A sampling line must be provided with to collect samples from the reactor. Under such sampling conditions, it is difficult to know the exact reaction conditions in the reactor because polymerization occurs before sampling is accomplished (U.S. Pat. No. 3,835,106).

In prior art processes for preparing polyethylenes, control of the density has been also carried out by the method in which the feed volumes of ethylene and comonomer are controlled by means of operation of respective valves in response to the density measured of the formed polyethylene. However, the method also encounters difficulty related to delay in the response due to the fact that is takes approximately an hour to accomplish the measurement of the density. For the solution of this problem, a method to monitor the inside of the reactor directly has also been proposed. The method, however, is not satisfactory for same reasons as described above in connection with the method wherein the melt index is measured. Another prior art method involves monitoring the inside of the reactor and measuring the pressure in the reactor in order to control the properties of the final product or the ethylene copolymer having uniform quality (U.S. Pat. No. 3,691,142). However, as of yet no completely satisfactory method for producing polyolefins having desired properties, in particular, the desired melt index and/or density has previously been devised.

It is, therefore, an object of the invention to provide a process for preparing polyolefins having extremely uniform predetermined properties in the presence of a Ziegler catalyst and hydrogen by polymerizing olefin, which comprises analyzing the gas phase established in the reactor thereby avoiding the disadvantages involved in the measurements of the liquid phase as mentioned above.

It is another object of the invention to provide a process for preparing polyolefins having extremely uniform predetermined melt index in the presence of a Ziegler catalyst and hydrogen by polymerizing olefin, which comprises measuring the gas phase components set up in the reactor.

It is still another object of the invention to provide a process for preparing polyolefins having extremely uniform predetermined density in the presence of a Ziegler catalyst and hydrogen by polymerizing olefin, which comprises measuring the gas phase components set up in the reactor.

DISCLOSURE OF INVENTION

Accordingly, the invention provides a process for preparing polyolefins having predetermined properties by polymerizing olefin in the presence of a Ziegler catalyst and hydrogen. At least two parameters relating to the concentrations of one or more olefin monomers and of hydrogen in the reactor are detected by gas chromatography. Signals responsive to the parameters detected by gas chromatography are fed to a computer which compares the signals with the preset values and emits new signals as a function of the deviation from the preset values to control hydrogen and olefin feed volumes and/or the amount of catalyst into the reactor and the pressure inside the reactor, thereby controlling the amounts of the olefin and/or hydrogen, thus resulting in the preparation of polyolefins having the predetermined properties. In this manner, when prompt response is made to the data of olefin and hydrogen concentration measurements in the gas phase within the reactor, detected by high-speed gaschromatography, for example, at intervals of one minute, no hunting results in controlling the properties of the resulting polyolefin. It is difficult, however, to control olefin and hydrogen feed volumes into the reactor and pressure in the reactor by means of manual operation responsive to the data detected by high-speed gaschromatography (even if the measurement is performed by high-speed gaschromatography at intervals of one minute, the slow response caused by the manual operation results in hunting with respect to the desired properties of the resulting polymer). Therefore, in the method of the present invention, control of the feed volumes into the reactor and the pressure in it is achieved by means of an automatic control through employment of a computer. In the process for the preparation of polyolefins having predetermined melt index in the presence of a Ziegler catalyst and hydrogen, the parameters relating to the concentrations of olefin and hydrogen in the reactor are also detected by gaschromatography. The signals responsive to the parameters detected by gaschromatography are applied to the computer which compares the signals with the preset values relating to the predetermined melt index in the computer and emits new signals as a function of the deviation from the present values to control the hydrogen feed volume into the reactor, the pressure in the reactor, and optionally the amount of catalyst feed, thereby controlling the concentrations of olefin and hydrogen, thus resulting in the preparation of polyolefin having the predetermined melt index.

Further, in preparing polyolefins, having a predetermined density, by polymerizing not less than two olefin monomers in the presence of a Ziegler catalyst and hydrogen, in accordance with the present invention the parameters relating to the concentrations of the olefin monomers are detected by gaschromatography. Signals representative of the parameters detected by gaschromatography are applied to the computer which compares the signals with the preset values relating to the predetermined density and emits new signals as a function of the deviation from the preset values to control the olefin feed volumes into the reactor, thereby controlling the concentrations of olefins, thus resulting in the preparation of a polyolefin having the predetermined density.

In the method of the invention, the concentrations of olefin and hydrogen are detected by gaschromatography in the gas phase within in the reactor. The reactor temperature is kept constant and the concentrations of olefin and/or hydrogen are controlled to produce polyolefins having predetermined properties, such as melt index and/or density. The gaschromatography to be used is so regulated that the time required to detect the olefin concentration is 10 minutes or below, preferably from five seconds to one minute. In the present description, "olefins" means α-olefins such as ethylene, propylene, 1-butene or 4-methyl-1-pentene, preferably those having from 2 to 6 carbon atoms; "polyolefins" means homopolymers and copolymers of the above-mentioned α-olefins or copolymers of at least one olefin mentioned above and a diolefin and "monomer" means the olefin which constitutes the major fraction of all olefins in the polymerization system, whereas "comonomer" means the remainder of the olefins and/or diolefins. In the process of copolymerization of monomer with comonomer for the preparation of a polyolefin, the ratio of comonomer to the monomer should be not more than 30 mole %, preferably not more than 10 mole %.

Examples of suitable diolefins are conjugated diolefins such as butadiene, propylene or isoprene and non-conjugated diolefins such as dicyclopentadiene or ethylidenenorbornene.

Especially preferred olefins are ethylene, and mixtures of ethylene and not more than 30 mole %, preferably not more than 10 mole %, of another olefin or diolefin.

The Ziegler catalysts to be used in the preparation of polyolefins according to the invention generally contain two major components: (a) a compound of a transition metal belonging to Group IV to VI in the Mendelejeff's periodic table, and (b) an organometallic compound or hydride of a metal belonging, II or Group I to III in the periodic table. Especially preferred are those that contain as the major constituent a titanium or vanadium halide, and an organoaluminum compound. The components (a) and (b) may be supported on a carrier or may be denatured with a denaturing agent such as an electron donor. As the Ziegler catalysts in the present invention, there may be employed those disclosed, for example, in U.S. Pat. Nos. 3,257,332; 3,826,792; 3,113,115; 3,546,133; 4,125,698; 4,071,672; 4,071,674; 3,642,746; 3,051,690 and 3,058,963, and British Patent No. 1,140,649.

In the polymerization of an olefin, the quantities of (a) and (b) components in the catalyst to be used will be as follows: the quantity of the (a) component will be 0.001 to 100 m mole per liter of solvent, based on the titanium, and the quantity of the (b) component composed of an organometallic compound or hydride of a metal belonging, II or Group I to III 0.1 to 1,000 moles, preferably 0.2 to 100 moles, per mole of (a) component.

The polymerization reaction of the present invention may be performed in a similar manner as in the conventional polymerization of olefins with a Ziegler catalyst. Thus, the polymerization reaction is performed substantially in the absence of oxygen and water. The polymerization reaction is performed in an inert solvent, such as an aliphatic hydrocarbon, e.g. hexane, heptane or kerosene, into which a catalyst, an olefin and, if necessary, a diolefin are fed to effect the polymerization. The polymerization reaction is normally performed at a temperature of from 20° to 200° C., preferably at 50° to 180° C. The polymerization reaction is preferably performed under pressure, generally at pressure of from 2 to 100 kg/cm$^2$.

DESCRIPTION OF THE PREFERRED EMBODIMENTS

Figure 1:
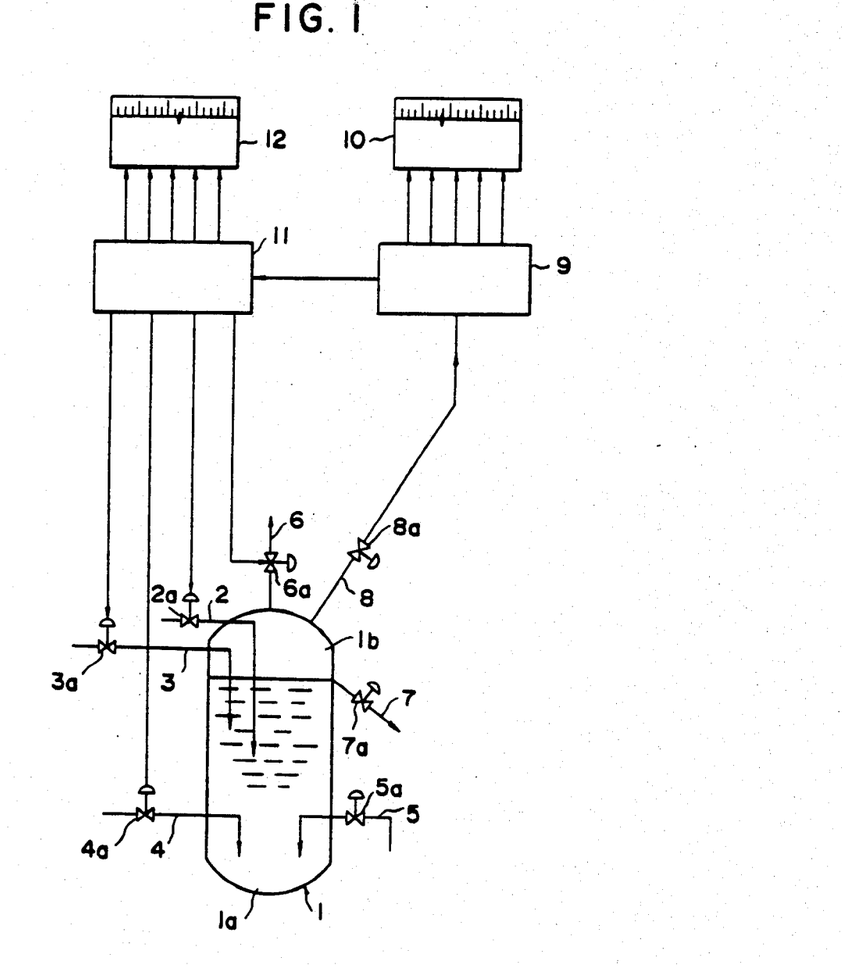
FIG. 1 illustrates a block diagram of an embodiment of the present invention.

FIG. 1 illustrates a block diagram of an embodiment of the present invention for the preparation of polyolefins, wherein the reactor 1 is kept at a constant temperature and contains a liquid phase 1a and a gas phase 1b. The reactor 1 is equipped with the lines 2, 3, 4 and 5 for feeding hydrogen, olefin, catalyst and solvent into the reactor, respectively, as well as the line 6 for releasing pressure from the reactor and the line 7 for removing the resulting polyolefin from the reactor, respectively. Further, the feed lines 2, 3, 4 and 5 are equipped with control valves 2a, 3a, 4a and 5a to control the feed volumes, respectively. Also, the vent line 6 and the outlet line 7 are equipped with the vent valve 6a and the switch valve 7a, respectively. The degree of opening of the valves 2a, 3a, 6a and, in some cases 4a is controlled in response to the control signals from the computer, yet to be described in order to control the concentrations of hydrogen and olefin to produce polyolefins having the predetermined melt index. The gas phase, in 1b the reactor 1 is equipped with the sampling line 8. The hydrogen and olefin in 1b are introduced through the switch valve 8a into the gas chromatograph 9 for measurement of their concentrations. The gas-chromatography to be used should be a high-speed gas chromatograph which requires less time for the detection of olefin (i.e. retention time) than the residence time of the product in the reactor (the retention time whould be not more than 10 minutes, preferably from five seconds to one minute).

The electric signals representative of the concentrations of hydrogen and olefin detected by the gas-chromatography 9 are fed to the computer 11. The computer 11 is programed to determine the polymerization conditions under which polyolefins having the predetermined melt index are produced. The computer 11 operates in response to changes in the input signals and emits new signals to control the hydrogen feed valve 2a, vent valve 6a, olefin feed valve 3a and, in some cases catalyst feed valve 4a also, whereby the concentrations of olefin and hydrogen are controlled so as to produce polyolefins having the predetermined melt index.

In this case, the data from gaschromatograph 9 and the control signals emitted from the computer 11 are recorded on the recorders 10 and 12, respectively.

Figure 3A:
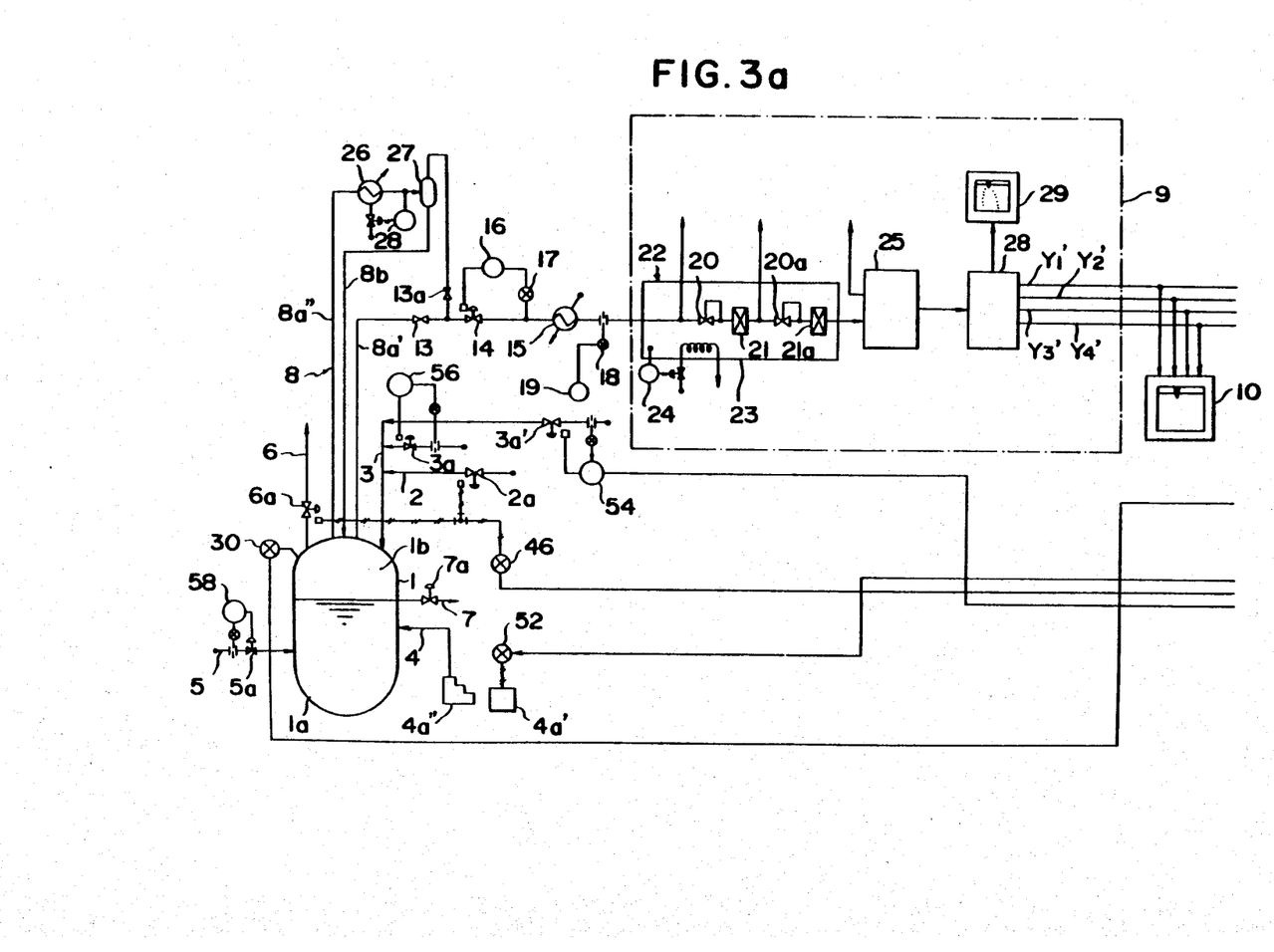
FIGS. 3a and 3b illustrate a block diagram of an embodiment of the control system in the present invention.
Figure 3B:
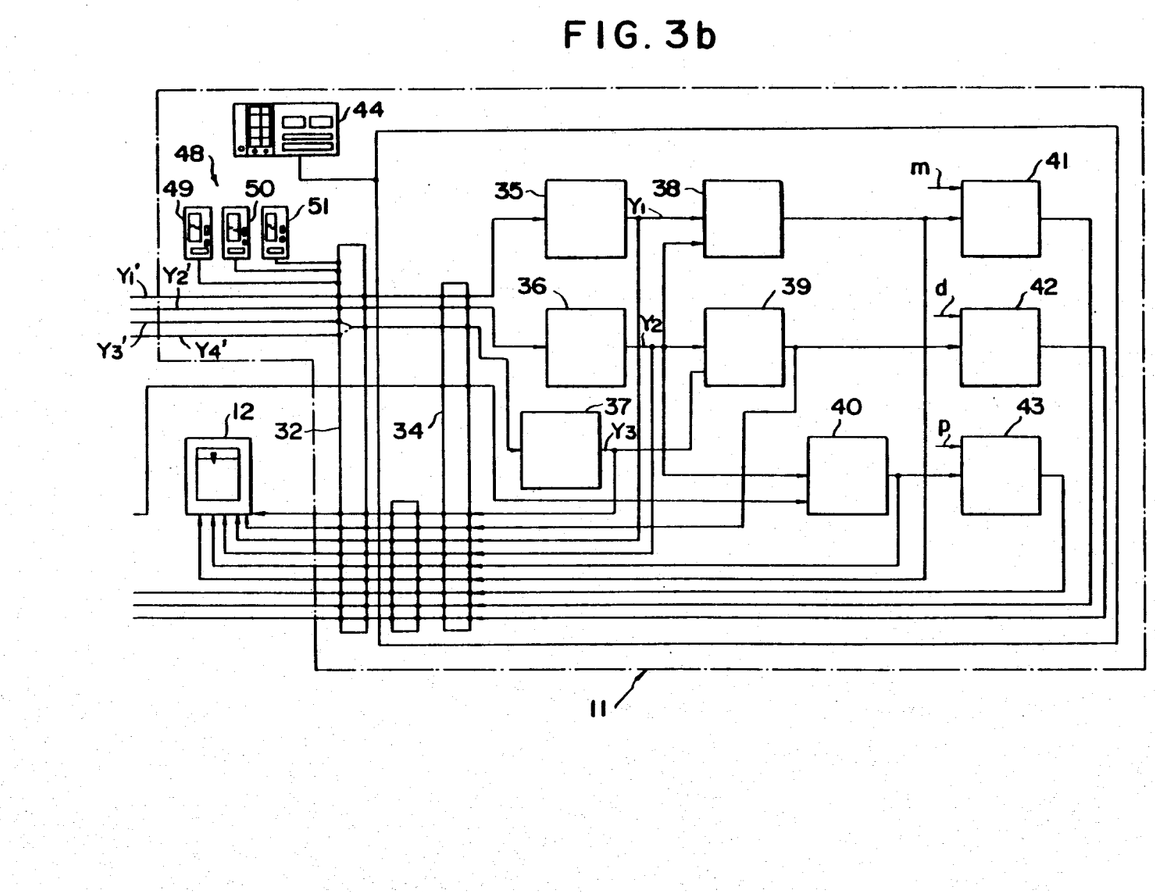

FIGS. 3a–3b illustrate preferred embodiments of the control system for performing the process according to the invention. Some elements in FIGS. 3a–3b that are identical with those in FIG. 1 are represented by the corresponding reference numerals. In summary, the present invention, provides a process for preparing polyolefins having the predetermined properties, wherein hydrogen and olefin are sampled through the sample line 8 from the gas phase 1b in the reactor 1; the sampled gases are detected by the process gaschromatograph 9; the signals representative of the concentrations are fed to the computer 11 finally; the hydrogen feed valve 2a, vent valve 6a and the olefin feed valve 3a are manipulated by the operation control output of the computer 11 finally to control the concentrations of hydrogen and olefin in the reactor.

In the embodiment illustrated in FIG. 3a, the sampling line 8 is in the form of dual sampling lines 8a' and 8a". The sampling line 8a' is basically used to measure directly the gases in the gas phase 1b of the reactor. In the line 8a', the sample gas is passed through the block valve 13 which is closed when using sampling line 8a", flashed by means of the pressure control valve 14 which reduces the sample gas pressure to the predetermined value, and then vaporized completely with the sample vaporizer 15. Numeral 16 indicates a PID controller to control the control valve 14 by means of PID (proportional-plus-integral-plus-derivative) control, responsive to the sample pressure detected by the transmitter 17. The flow rate of sample gas in the line is monitored by means of the flow indicator 19 through the flow transmitter 18, for example, an, to indicate if the amount of flow is maintained within the standardized range or not. Then, the sample gas is pretreated by means of the sample pretreatment unit 22 which is composed of the vent valves 20 and 20a, and the filters 21 and 21a, in two steps, and regulated so as to suit the operation of the process gas chromatograph 9. The sample pretreatment unit 22 is provided with a thermostat 23 to prevent condensation of the sample gas and the thermostat 23 is kept at a constant temperature between 40° and 150° C. by means of the thermocontroller 24. Thus, by using the sample line 8a', the sample gas injected into the detector 25 of the process gas chromatograph 9 is always dry, even in an operation in which a monomer having a boiling point close to that of the solvent is used. In some cases only, monomers having significant differences in boiling points compared with that of solvent are used to produce polyolefins of certain standard or brand. In such cases, certain and stable measurement of the sample gas by the process gas chromatograph may be continuously carried out by using the sample line 8a" equipped prior to the pressure control valve 14. Thus, in the sample line 8a", the solvent in the sample gas sampled from the gas phase 1b in the reactor 1 is condensed and separated by means of the sample condenser 26 and the sample receiver 27. The sample temperature at the outlet of the sample condenser 26 is automatically controlled by the thermocontroller 28 at a constant temperature between $-15°$ and $10°$ C. Thus, the sample gas from the sample receiver 27 may be completely vaporized by heating it with the vaporizer 15 after flashing it through the pressure control valve 14. In this case, the separated solvent is returned into the reactor 1 through the line 8b. Further, selection of the sampling lines, either 8a' or 8a", is provided by operating of the block valve 13a provided prior to the sampling line 8a' in conjunction with operation of the block valve 13. Employment of such a sampling system provides the advantage that normal operation of the process gaschromatograph is maintained without paying much attention to the sampling conditions. In this latter case, the composition of the gas phase in the reactor is, however, different from that of the sample gas. In the embodiment of the present invention wherein the temperatures of the reactor and of the outlet of the sample condenser 26 are controlled independently, the gas composition in the reactor may readily be estimated from the analysts of the sample gas by means of a simple precalculation of the gas-liquid equilibrium. Thus, in the embodiment of the present invention, the sample gas is completely vaporized before it is introduced into the process gaschromatograph. Therefore, the sampling system of the present invention avoids completely problems encountered in conventional systems occasioned by liquid flow of components having high boiling points into the sampling line or condensation thereof therein, which causes entrainment of liquid particles in the sample gas entering the gas chromatograph, resulting in variations in the gaschromatography data or inoperation thereof due to packing in the line. The sampling system described above also improves the stability of gaschromatography and consequently enables accurate measurement of gas concentrations in the gas phase of the reactor. In addition, the foregoing allows for present switching between the sampling lines 8a' and 8a" to enable variations in operation, using different monomers to meet predetermined product standards.

In summary, the sampling system used in the above-described embodiment of the present invention meets the requirements for both the gaschromatography for the detection of gas concentrations and for the preparation of polyolefins meeting the predetermined standard, at the same time.

Figure 4:
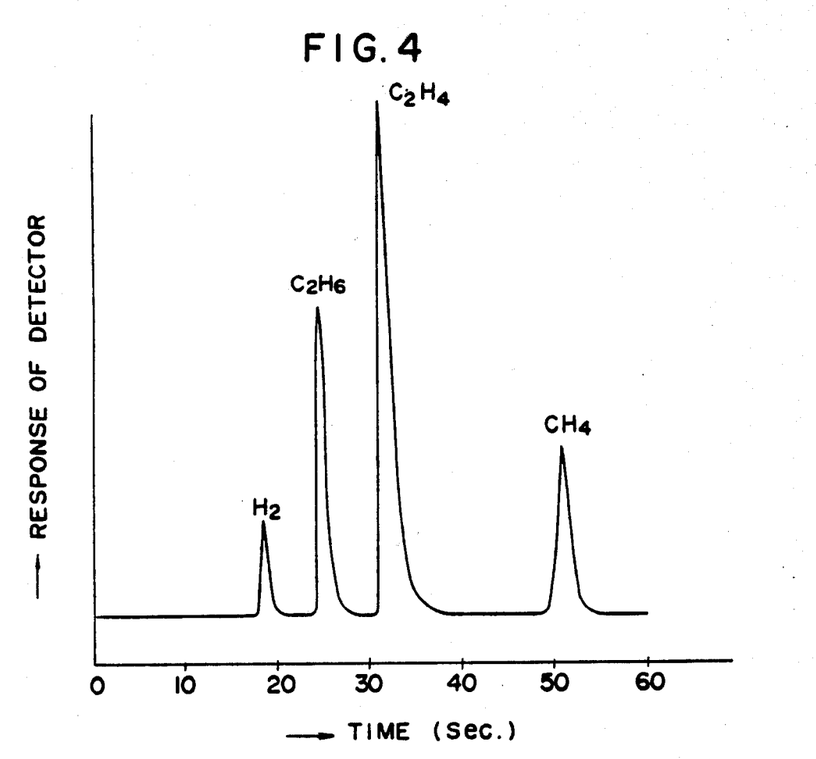
FIG. 4 illustrates responses of the detector of the gas chromatograph in the controller.

Operation of the detector 25 of the process gaschromatograph 9 will be explained using polymerization of ethylene as an example. The sample gas is adjusted to conditions suitable for gaschromatography through employment of the sample pretreatment unit 22 and is introduced into a separation column of the detector 25. Then, each component of the sample gas is detected by a thermal contact detector having a resistance bridge. Each output signal generated from the detector shows a response as shown in FIG. 4. In the case where ethylene is used as the monomer, the normal order in the response time is inherently hydrogen ($H_2$), methane ($CH_4$), ethane ($C_2H_6$) and ethylene ($C_2H_4$). However, in the detection system of the present invention, the response time of ethane and ethylene may be put between hydrogen and methane, as shown in FIG. 4, by bypassing ethane and ethylene into columns of shorter response time, using three columns connected in series and parallel. By doing so, the detection time may be shortened.

The output signals generated by the detector are applied to the controller 28. Since each output signal, for example, that corresponding to hydrogen ($H_2$) or ethylene ($C_2H_4$) as shown in FIG. 4, is generated from the detector at intervals of a certain fixed period, depending on the inherent character of the detector 25, the peak value of a signal corresponding to each gas component may be measured the the respective response times in the controller 28 and taken out as a d.c. voltage signal. The peak value for each component represents its concentration. The d.c. voltage signals are converted into a d.c. voltage of 1-5 V, according to the magnitude of the peak value, and taken as signals $Y_1'$ and $Y_2'$, respectively.

In a continuous process for the preparation of polyolefins, measurement of the components in the reactor by gas chromotograph 9 should be carried out at short intervals, as described above. It is desirable that the intervals be within 10 minutes, preferably from five seconds to three minutes.

In this embodiment of the present invention, YAMATAKE-HONEYWELL H-1000TE by Yamatake-Honeywell Co., Tokyo, Japan is employed for the gaschromatography. The Model H-1000TE used in the present invention can be operated at intervals within two minutes and, in practice, can be automatically operated at intervals of 60 seconds, as shown in FIG. 4.

Consequently, the signals generated from the detected 25 at intervals of measurement time as shown in FIG. 4 are transmitted to the controller 28, wherein the received signals are separated and each peak value is measured and converted into a d.c. voltage signal within 1-5 V according to the magnitude of each peak value.

The signals are stored for intervals of measurement time and output successively. When the Model H-1000TE is used, hydrogen ($H_2$), monomer-A, monomer-B and monomer-C, for instance, in a certain sample gas may be measured and the resulting d.c. voltage signals may be represented successively as $Y_1'$, $Y_2'$, $Y_3'$ and $Y_4'$. As described above, be separating the signals generated from the detector 25 into those for respective components and generating new signals successively after the storage thereof, need for complex processing in the computer of the signals generated from the detector need not be conducted and, consequently, simplicity of system, lower cost and improvement in overall reliability may be attained. The signals separated into those for the respective components in the controller 28 are recorded on the recorder 29. The d.c. voltage signals $Y_1'-Y_4'$ are for to the computer 11 (FIG. 3b) and, simultaneously, recorded on the multipoint recorder 10. The process computer controller system will be explained hereinafter by referring to FIG. 3b.

The successive d.c. voltage signals $Y_1'$, $Y_2'$, $Y_3'$ and $Y_4'$ (each 1-5 V) corresponding to $H_2$, monomer-A, monomer-B and monomer-C generated by the gas chromatograph 9 and the voltage signal (1-5 V) generated by the pressure transmitter 30 of the reactor 1 are connected to the input terminal 32 of the computer 11. The computer 11 has a scanning plot (not illustrated) for scanning five signals noted above automatically and periodically, a A/D (analog/digital) converting plot 34, linearizing plots 35, 36 and 37 for linearizing the signals generated from the converter, operating plots 38, 39 and 40 for operating the signals, and controlling plots 41, 42 and 43 for controlling the signals generated from the operating plots in comparison with the standard values preestablished. In this embodiment, YAMATAKE-HONEYWELL TDCS-2000 by Yamatake-Honeywell Co., Tokyo, Japan is used as the computer 11.

The method for controlling of properties of polyolefins by using the process computer control system will now be explained.

First, the control loop for controlling the melt index (M.I.) of polyolefins will be explained in detail using, for example, the polymerization of ethylene. As mentioned above, the M.I. value of polymers is fundamentally a function of molar ratio of hydrogen to monomer-A in the gas phase 1b of the reactor 1. In the process for preparing polyethylene from hydrogen ($H_2$) and ethylene as monomer-A, the control loop for controlling the molar ratio of hydrogen ($H_2$) to ethylene ($C_2H_4$) (represented as $H_2/C_2$ hereinafter) for preparing polyethylene having the predetermined M.I. is described below. The signals $Y_1'$ and $Y_2'$, A/D converted by the converter 34, representing $H_2$ mole % and $C_2$ mole %, respectively, are applied to the linearizing plots 35 and 36, respectively. As output signals generated from the gas chromatograph 9 correspond to the individual peak heights shown in FIG. 4, they are calibrated into respective correct mole % concentrations by means of linearization in the linearizing plots 35 and 36, respectively.

When the integration of the signals is carried out in the controller 28 of the gas chromatograph 9, the mole % concentration may be measured accurately. In such a case, it is unnecessary to linearize the signals in the computer.

The linearization of signals in the linearizing plots 35 and 36 may be carried out by a folded-line approximated operation. The output signals $Y_1$ and $Y_2$ generated from the linearizing plots 35 and 36 indicate exactly the mole % concentrations of hydrogen ($H_2$) and ethylene ($C_2H_4$), respectively. The signals $Y_1$ and $Y_2$ are again converted into the analog signals by the D/A converter 34, and the resulting voltage signals (1–5 V) are recorded on the multipoint recorder 12 and simultaneously applied to the operating plot 38.

In the operating plot 38 $Y_1/Y_2$ operation is performed and the resulting $Y_1/Y_2$ output is recorded on the multipoint recorder 12 as the $H_2/C_2$ value through the D/A converter 34 and simultaneously applied to the PID controller 41 as a process variable. In the PID controller 41, the preestablished value m corresponding to the predetermined melt index has been previously set by operation of the data entry panel 44 by an operator. In the PID controller 41, the input signal ($H_2/C_2$ value) is compared with the preestablished value m, and the both are PID controlled automatically for coincidence or agreement. In accordance with the difference between the values, a 4–20 mA current signal is generated. The current signal is converted into an air pressure signal within 0.2–1.0 kg/cm$^2$G with the current/air pressure converter 46 according to the magnitude of the value, and the resulting pressure signal is supplied to the positioners of the hydrogen feed valve 2a and the vent valve 6a. Control of the positioners of the valves 2a and 6a is carried out by means of the so-called split range method.

Figure 5:
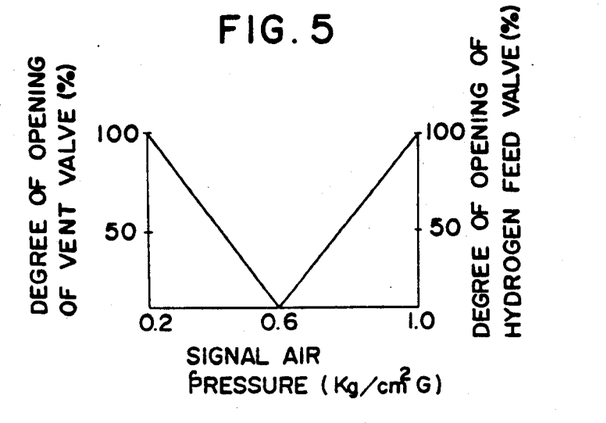
FIG. 5 illustrates a controlling system including a hydrogen feed valve and a vent valve (pressure release valve) in the controller.

As illustrated in FIG. 5, the valve positioner of the vent valve 6a is regulated in such manner that it is completely opened at an input air signal pressure of 0.2 kg/cm$^2$G or below, and completely closed at an pressure of 0.6 kg/cm$^2$G or above, and further the hydrogen feed valve 2a is regulated in such a manner that it is completely closed at a pressure of 0.6 kg/cm$^2$G or below and completely opened at 1.0 kg/cm$^2$G or above. Thus control of the two valves may be carried out by the single pressure control signal.

The input of the standard predetermined $H_2/C_2$ value may be fed into the computer 11 by using the data entry panel 44. Alternatively, it may be entered using the $H_2/C_2$ analog indicator 49 of the analog display apparatus 48. The indicator 49 also indicates the agreement or difference of the $H_2/C_2$ value determined by the gas-chromatography and processed the computer, with the preestablished $H_2/C_2$ value in the form of analog display.

In this manner, by using the $H_2/C_2$ control loop, the $H_2/C_2$ concentrations in the gas phase 1b of the reactor 1 may be automatically regulated to agree with the preestablished value, and in consequence, polyethylene having the predetermined M.I. may be continuously produced. Therefore, the $H_2/C_2$ control loop is referred to as the M.I. control loop since the $H_2/C_2$ control is substantially equal to the M.I. control.

In the introduction of the desired volume of monomer (ethylene) into the reactor 1 containing gas phase 1b, if an external influence occurs, for example, a change in the activity of Ziergler catalyst introduced into the reactor 1 through the catalyst feed line 5, the partial pressure of the monomer ($C_2$) in the reactor 1 varies; the volume of the monomer dissolved in the solvent also varies, correlated to the variation of the partial pressure; and the dissolved monomer flows out of system as the unreacted monomer together with the solvent. In other words, the polymerization rate varies even when the monomer feed volume is kept constant.

Heretofore, if external factors are introduced the partial pressure of monomer ($C_2$) alone varies and this results in the variation of the $H_2/C_2$ value of the M.I. value. However, in the present invention, as the $H_2/C_2$ value is controlled automatically with the hydrogen feed value 2a and the vent valve 6a as described above, the M.I. may be kept constant even when such external influences intervene. However, even if such polymerization conditions as described above are maintained, the polymerization rate will deviate from the preestablished rate. Thus, in the present invention, the polymerization rate may be restored to a preestablished rate by controlling the catalyst feed volume to compensate for the variation in catalyst activity, thereby returning the partial pressure of monomer ($C_2$) to the predetermined value.

The control loop for $C_2$ partial pressure will be now be explained. The output voltage signal (1–5 V) generated from the pressure transmitter 30 at the pressure $P_0$ of the reactor 1 and the output signal $Y_2$ representing the ethylene mole % generated from the linearizing plot 36 are applied to the operating plot 40 and the operation $(P_0+1.03)Y_2$ is performed. In the equation, the value in parentheses requires conversion to absolute pressure, wherein 1.03 represents atmospheric pressure. When an absolute pressure gauge in the pressure transmitter 30 of the reactor 1 is used, the value 1.03 in the parentheses of the equation becomes unnecessary. The output signal generated from the operating plot 40 is recorded on the multipoint recorder 12 through the D/A converter 34 and used as the running indicator for the $C_2$ partial pressure. On the other hand, the $C_2$ partial pressure signal is applied to the PID controller 43 in the same way as in the $H_2/C_2$ control loop described above, and the PID is controlled so as to coincide with the preestablished standard value for the $C_2$ partial pressure p in the reactor supplied by an operator with the data entry panel 44 or with the partial pressure analog indicator 50 of the analog display apparatus 48. The output signal therefor (4–20 mA) is applied to the current/air pressure converter 52 through the D/A converter 34 and converted to the operation signal for the stroke control unit 4a' of the catalyst feed pump 4a" in the form of a pneumatic signal. In this manner, control of the $H_2/C_2$ ratio at the predetermined value and the regulation of the $C_2$ partial pressure at the predetermined value when an outside influence such as variation of catalyst activity occurs may be simultaneously achieved. Further, properties of polyolefins when prepared with other olefins may be controlled by operations similar to those described above.

As previously mentioned, it is sometimes required to produce polyolefins having predetermined properties, in particular, predetermined density, while maintaining the ratio of monomer-A (for example, ethylene) and comonomer-B (for example, propylene), or the ratio of monomer-A and comonomer-C (for example, 1-butene) constant. Control of the comonomer ratio may be achieved by usoing the same procedure as in the $H_2/C_2$ value control loop. Signals corresponding to monomer-A, monomer-B, and monomer-C, generated from the gas chromatograph 9 are represented, say, by $Y_2'$, $Y_3'$ and $Y_4'$, respectively. The signals $Y_3'$ and $Y_4'$ are alternatively applied to the D/A converter 34 by an change-over switch (not illustrated.) An example in which the signal $Y_3'$ is chosen will be explained hereinafter.

The signals $Y_2'$ and $Y_3'$ for monomers A and B are applied to the linearizing plots 36 and 37 and thereby linearized. The output signals $Y_2$ and $Y_3$ are recorded on the recorder 12 through the D/A converter 34 and simultaneously applied to the operating plot 39. Operation of $Y_2/Y_3$ is performed in the operating plot 39 and the output therefrom is recorded on the recorder 12 through the D/A converter 34 and simultaneously applied to the controller 42.

In the controller 42, the input signal is PID-controlled so as to coincide with the predetermined standard value d for the comonomer ratio given by an operator with the data entry panel 44 or with the comonomer ratio analog indicator 51 of the analog display apparatus. The output signal therefor (4–20 mA) is controlled with the cascade type controller 54 through the D/A converter 34, and the feed volume of the comonomer is regulated by operating the comonomer feed valve 3a'.

In this manner, by controlling the concentrations of monomer and comonomer, a continuous process for preparation of polyolefins having a predetermined density may be performed.

In the embodiments described above, the feed volumes of olefin monomer and of solvent are controlled automatically with the flow rate indication controllers 56 and 58 through the olefin feed valve 3a and the solvent feed valve 5a, respectively. As was the case in the process computer control mentioned above, the control may be performed either with the output from the computer 11 alone, or with combined output control from the computer 11 and the flow rate indication controllers 56 and 58.

As explained above, the process for preparation of polyolefins according to the invention employs a technique to analyze the gas phase of the reactor, whereby the condition of the reaction system may be monitored with exactness. By measuring the gas phase and making response, for example, at 1 minute intervals with high speed gaschromatography (FIG. 4), almost no hunting occurs with the controlling of properties such as melt index and/or density. Further, since the process of the present invention employs a computer control system, instability due to manual control, depending on the operator's intuition may be avoided.

Figure 2:
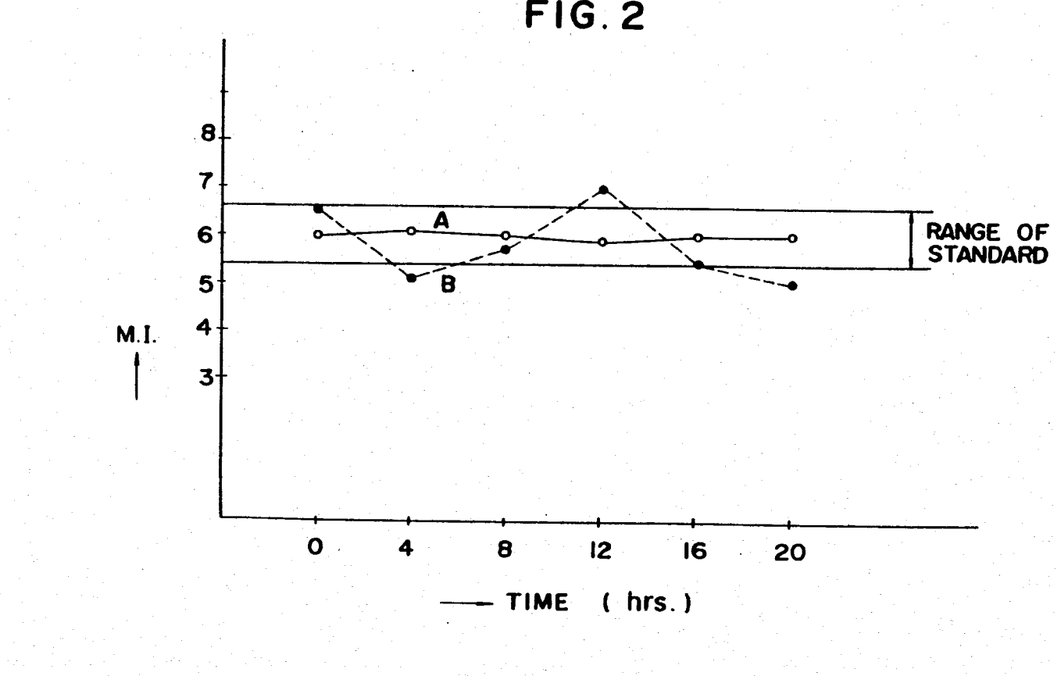
FIG. 2 illustrates the relationship between the polymerization period and the melt index of the resulting polyolefin.

In FIG. 2, the solid line A illustrates the relationship between the melt index and the polymerization period for the continuous preparation of polyethylene according to the invention; whereas the dotted line B illustrates the relationship between the melt index and the polymerization period when the control of the melt index is carried out by manual operation of the hydrogen feed valve, the ehtylene feed valve or the like with the melt index being measured at every 4 hour intervals.

The polymerization period given as the abscissa in FIG. 2 is not the from the initiation of the polymerization but rather from an arbitrary time after reaching steady state in the process.

As shown in FIG. 2, the process of the present invention makes possible steady state production of polyolefins having uniform melt index.

Figure 6:
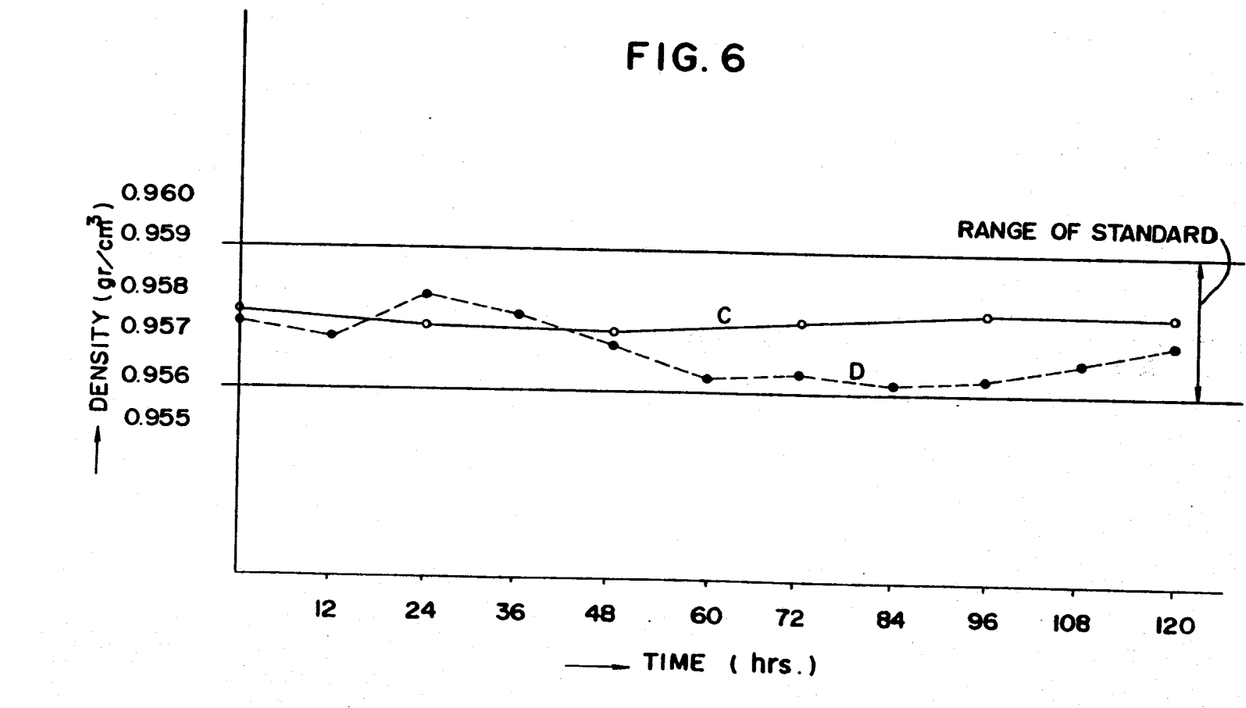
FIG. 6 illustrates the relationship between the polymerization period and the density of the resulting polyolefin.

In FIG. 6, the solid line C illustrates the relationship between the density and the polymerization period for the continuous production of polyethylene according to the invention; whereas the dotted line D illustrates the relationship between the density and the polymerization period when the control of the density is carried out by manual operation of the ethylene (monomer) feed valve and the propylene (comonomer) feed valve according to the density measured at 12 hour intervals. The polymerization period as abscissa in FIG. 6 is taken not from the initial time of the polymerization but from an arbitrary time at which steady state is achieved in the process. As shown in FIG. 6, the process of the present invention makes it possible to produce polyolefins having uniform density in a steady state operation.

INDUSTRIAL APPLICABILITY

As is from the foregoing embodiments, the present invention is useful in producing polyolefins having predetermined properties, in particular predetermined melt index and/or density, and is suitable, therefore, for steady production of polyolefins having uniform properties, inter alia, predetermined melt index and/or density, from an olefin in the presence of a Ziegler catalyst and hydrogen.

I claim:

1. A process for preparing a polyolefin having predetermined properties by polymerizing at least one olefin in the presence of a Ziegler catalyst and hydrogen in a gas/liquid phase reactor, said process comprising:
    introducing the catalyst, olefin to be polymerized and hydrogen into a gas/liquid phase reactor and establishing a continuous gas phase space above the liquid phase in said reactor;

analyzing the concentrations of the one olefin and hydrogen in the gas space within said reactor by gas chromatography;

generating input signals representative of said detected concentrations;

comparing said input signals with preset values corresponding to said predetermined properties;

generating control signals as a function of deviations between said input signals and said preset values; and, controlling the feed rates of said hydrogen and said one olefin responsive to said control signals.

2. A process for preparing a polyolefin as claimed in claim 1, wherein the polymerization of said olefin is conducted in a continuous manner.

3. A process in accordance with claim 1, wherein said input signals are fed to a computer, said computer comparing said input signals with preset values and generating said control signals.

4. The process of claim 1 wherein the temperature in said reactor is kept constant and the feed rates of said hydrogen and said one olefin are controlled to produce an olefin having a predetermined melt index.

5. The process of claim 1 wherein samples of the reactor gas phase are analyzed at intervals not more than 10 minutes apart.

6. The process of claim 1 wherein the olefin feed to the reactor is ethylene or a monomer mixture containing at least 70 mole % ethylene and 30 mole % or less of an α-olefin and/or a diolefin.

7. A process for preparing a polyolefin having a predetermined density by polymerizing at least two different olefins in the presence of a Ziegler catalyst and hydrogen in a gas/liquid phase reactor, which is characterized by:

introducing the catalyst, olefins to be polymerized and hydrogen into a reaction and establishing a gas phase space above the liquid phase in the reactor;

analyzing the concentrations of said olefins in the gas phase space within the reactor by gas chromatography;

generating input signals representative of said detected concentrations;

comparing said input signals with preset values corresponding to the desired density;

generating control signals as a function of deviations between said input signals and said preset values; and controlling the feed rates of said olefins responsive to said control signals to prepare a polyolefin having said density.

8. A process for preparing a polyolefin having a predetermined melt index by polymerizing at least one olefin in the presence of a Ziegler catalyst and hydrogen, said process comprising:

(a) introducing the catalyst, olefin to be polymerized and hydrogen into a gas/liquid phase reactor and establishing a continuous gas phase space above the liquid phase in the reactor;

(b) analyzing the concentration of the one olefin ($C_2$) and the concentration of hydrogen ($H_2$) in the gas space within the reactor by gas chromatography;

(c) generating an input signal Y1 representative of said hydrogen concentration and an input Y2 representative of said concentration of the one olefin;

(d) comprising said input signals with preset values corresponding to said melt index;

(e) generating control signals as a function of deviations between said input signals and said preset values; and (f) controlling the feed rate of said hydrogen, responsive to said control signals, to prepare a polyolefin having the predetermined melt index.

9. The process of claim 8 wherein signals Y1 and Y2 are converted into a single input signal Y1/Y2 and said single input signal is compared with a predetermined value for $H_2/C_2$ corresponding to the predetermined melt index and wherein control signals for said hydrogen feed rate are generated as a function of deviation between said input signal Y1/Y2 and the predetermined value of $H_2/C_2$.

10. In a process for preparing a polyolefin having a predetermined melt index by polymerizing at least one olefin in the presence of a Ziegler calalyst and hydrogen in a reactor, the improvement comprising:

(a) introducing the catalyst, olefin to be polymerized and hydrogen into a gas/liquid phase reactor and establishing a continuous gaseous phase space above the liquid phase in the reactor;

(b) analyzing the concentrations of the one olefin and hydrogen in the gas space within the reactor by gas chromatography;

(c) generating a hydrogen concentration signal ($H_2$) and an olefin concentration signal ($C_2$) representative of the values obtained by said analysis;

(d) converting said hydrogen concentration signal and said olefin concentration signal into a single signal representative of $H_2/C_2$;

(e) comparing said single $H_2/C_2$ signal with a preset value for $H_2/C_2$ corresponding to the predetermined melt index;

(f) generating control signals as a function of deviations between said input $H_2/C_2$ signal and said preset value for $H_2/C_2$;

(g) controlling the feed rate of said hydrogen and venting said gas space to control pressure responsive to said control signals;

(h) detecting the pressure within the reactor and generating a pressure signal representative of said detected pressure;

(i) converting said pressure signal to a signal representative of the partial pressure of said one olefin by multiplying said pressure signal by said olefin concentration signal;

(j) comparing said partial pressure signal to a preestablished value and generating a catalyst supply control signal as a function of deviation between said partial pressure signal and said preestablished value; and controlling the rate at which the catalyst is fed to the reactor, responsive to said catalyst supply control signal, to provide a polyolefin of the predetermined melt index.

11. The process of claim 10 wherein said pressure signal is converted to a value representative of absolute pressure prior to said multiplication.

12. A process for preparing a polyolefin as claimed in claims 8, 9, or 10 wherein the polymerization of said olefin is carried out by a continuous process.

13. A process in accordance with claims 8, 9, or 10 wherein said input signals are fed to a computer, said computer comparing said input signals with preset values and generating said control signals.

14. A process for preparing a polyolefin as claimed in claims 8, 9, or 10, wherein the temperature in said reactor is kept constant.

15. A process for preparing a polyolefin as claimed in claims 8, 9, or 10, wherein samples of the reactor gas phase are analyzed in not more than 10 minutes.

16. A process for preparing a polyolefin as claimed in claims 8, 9, or 10, wherein said olefin is ethylene or a mixture containing at least 70 mole % of ethylene and 30 mole % or less of an $\alpha$-olefin and/or diolefin.

17. A process for preparing a polyolefin haveing predetermined density by polymerizing at least two different olefins in the presence of a Ziegler catalyst and hydrogen in a gas/liquid phase reactor, which is characterized by:
  introducing the catalyst, olefins to be polymerized and hydrogen into a reactor and establishing a gas phase space above the liquid phase in the reactor;
  analyzing the concentrations of said olefins in the gas space within the reactor by gas chromatography;
  generating input signals representative of said detected concentrations;
  converting said concentration input signals into a ratio signal representative of the ratio of said detected concentrations;
  comparing said ratio signal with a preset value corresponding to the desired density;
  generating control signals as a function of deviations between said ratio signal and said preset value; and,
  controlling the feed rates of said olefins responsive to said control signals to prepare a polyolefin having said density.

18. A process in accordance with claims 7 or 17 wherein said input signals are fed to a computer, said computer comparing said input signals with preset values and generating said control signals.

19. A process for preparing a polyolefin as claimed in claim 7 or 17, wherein the temperature in said reactor is kept constant.

20. A process for preparing a polyolefin as claimed in claim 7 or 17, wherein the reactor gas phase is analyzed at intervals not more than 10 minutes apart.

21. A process for preparing a polyolefin as claimed in claim 7 or 17, wherein said olefin is a mixture of at least 70 mole % ethylene and 30 mole % or less of an $\alpha$-olefin and/or a diolefin.

22. The process of claim 1 or 8 additionally comprising controlling the pressure in said reactor by venting said gas phase space responsive to said control signals.

* * * * *

UNITED STATES PATENT AND TRADEMARK OFFICE
CERTIFICATE OF CORRECTION

PATENT NO. : 4,469,853
DATED : September 4, 1984
INVENTOR(S) : Ado MORI

It is certified that error appears in the above—identified patent and that said Letters Patent is hereby corrected as shown below:

On the title page;
Foreign Application Priority Data

| | | |
|---|---|---|
| April 23, 1979 | Japan | 54-48964 |
| April 23, 1980 | PCT | PCT/JP80/00085 |

Column 3, line 23 delete "set up".
Column 3, line 68 delete "present" and insert --preset--.
Column 4, line 57 "belonging, II or Group I to III" should read --belonging to Group I, II or III--.
Column 5, line 7 "ing, II or Group I to III" should read --ing to Group I, II or III--.
Column 6, line 23 "the" should read --to--.
Column 6, line 52 "an" should read --an orificemeter--.
Column 7, line 31 "analysts" should read --analysis--.
Column 7, line 47-48 delete "present".
Column 8, line 59 "for" should read --fed--.
Column 10, line 6 "an" should read --a--.
Column 10, line 58 delete "be".
Column 11, line 32 "usoing" should read --using--.
Column 11, line 37 "an" should read --a--.

UNITED STATES PATENT AND TRADEMARK OFFICE
CERTIFICATE OF CORRECTION

PATENT NO. : 4,469,853

DATED : September 4, 1984

INVENTOR(S) : Ado MORI

It is certified that error appears in the above—identified patent and that said Letters Patent is hereby corrected as shown below:

```
Column 12, line 25 "ehtylene" should read --ethylene--.
Column 12, line 26 delete "every".
Column 12, line 52 "As is" should read --as is clear--.
Column 13, line 37 "a reaction" should read --the reactor--.
Column 13, line 67 "comprising" should read --comparing--.
Column 14, lines 55-58 should be indented and in line 55
         "controlling" should read --(K) controlling--.
Column 15, line 11 "haveing" should read --having--.
```

Signed and Sealed this

Second Day of July 1985

[SEAL]

*Attest:*

DONALD J. QUIGG

*Attesting Officer*   *Acting Commissioner of Patents and Trademarks*